(12) United States Patent
McGinnis

(10) Patent No.: US 6,530,783 B1
(45) Date of Patent: Mar. 11, 2003

(54) CARDIOPULMONARY RESUSCITATION MANNEQUIN

(75) Inventor: M. Gayle McGinnis, Indpls, IN (US)

(73) Assignee: American Red Cross of Greater Indianapolis, Indianapolis, IN (US)

( * ) Notice: Subject to any disclaimer, the term of this patent is extended or adjusted under 35 U.S.C. 154(b) by 0 days.

(21) Appl. No.: 09/703,891

(22) Filed: Nov. 1, 2000

(51) Int. Cl.$^7$ ............................................... G09B 23/28
(52) U.S. Cl. ........................ 434/265; 434/262; 434/267
(58) Field of Search ................................. 434/265, 267, 434/274, 262, 270–275, 256

(56) References Cited

U.S. PATENT DOCUMENTS

| | | | | |
|---|---|---|---|---|
| 4,194,303 A | * | 3/1980 | Heller ............................. | 35/17 |
| 4,984,987 A | * | 1/1991 | Brault et al. .................. | 434/265 |
| 5,733,170 A | * | 3/1998 | Wotton ......................... | 446/385 |
| 5,885,084 A | * | 3/1999 | Pastrick et al. .............. | 434/265 |
| 5,989,095 A | * | 11/1999 | Wotton ......................... | 446/385 |

* cited by examiner

Primary Examiner—Derris H. Banks
Assistant Examiner—Dmitry Suhol
(74) Attorney, Agent, or Firm—Krieg DeVault Lundy, LLP

(57) ABSTRACT

A new and improved trainer mannequin comprising a body having a head and a torso made of common household items. The head and the torso are hollow. The head has openings for a mouth and two nostrils, and additionally has a neck and a neck opening. All the openings provide access to the interior of the head. The torso also has a neck and neck opening, and is secured to the head by connecting the necks in a way that provides a seal between the interior of the head and the torso. The torso additionally can be interchanged to provide training in three basic aid training techniques. For mouth-to-mouth breathing, the torso is an attached bag collapsible and expandable to simulate a lung. For aid in choking, also known as the Heimlich maneuver, the torso is self-supporting in order to provide a more constant volume and greater resistance to collapsing. This torso also simulates a full human torso including stomach and chest. For training this technique, an object is securely placed in the neck of the mannequin to restrict the air flow between the torso and the head, but the object may be forcibly removed from the neck by compressing the torso. Finally, for chest compression training, the torso is the same or similar to the torso for the choking technique, but the bottom is removed in order to stuff it with a filler to provide additional resistance to collapsing and rebounding of the torso.

37 Claims, 2 Drawing Sheets

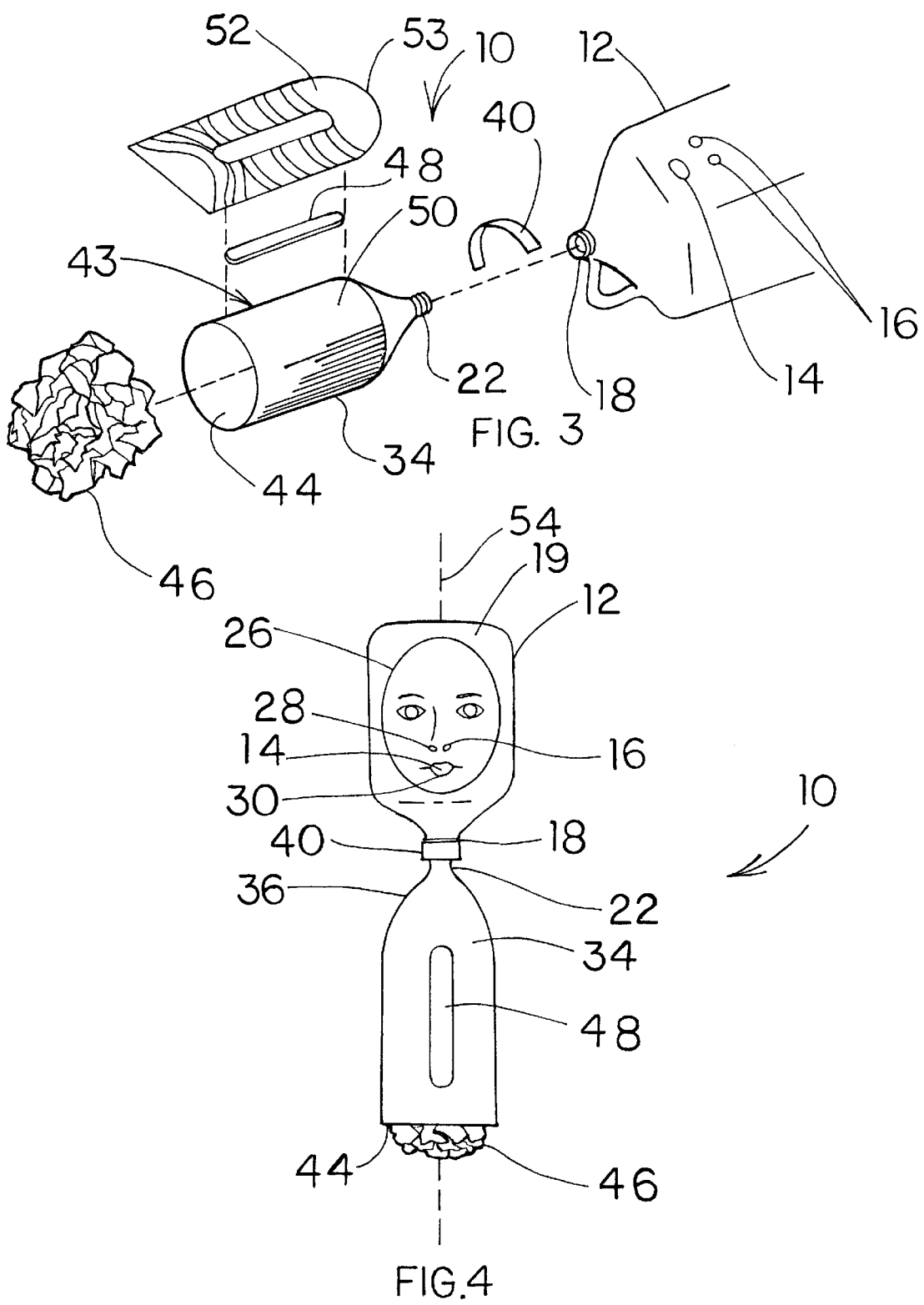

CARDIOPULMONARY RESUSCITATION MANNEQUIN

BACKGROUND OF THE INVENTION

The present invention pertains to a cardiopulmonary resuscitation (CPR) trainer, and more particularly to a new CPR trainer mannequin for use by minor children which effectively assists in practicing the basic aid skills to be learned during basic aid training, but which is made from common household items to make it inexpensive so that each child in a given class has his/her own mannequin.

CPR mannequins have long been provided to individuals participating in basic aid training classes. Mannequins having human features and physical characteristics have been used for teaching respiratory aid techniques, including mouth-to-mouth breathing, choking aid (the Heimlich maneuver) and chest compressions in order to provide a trainee a more realistic feel for performing the techniques on a real human person. In mouth-to-mouth breathing, a humanoid mannequin is provided that allows the trainee to pinch its nostrils and breathe into its mouth, thereby inflating and deflating a lung. In the choking aid technique, a humanoid mannequin is provided that contains an obstruction in the throat of the mannequin that restricts the passage of air from the lung to the mouth and vice versa. By applying a force to the torso of the mannequin, the object is removed and the breathing passageway cleared for normal breathing. For teaching chest compressions, a humanoid mannequin is provided on which the trainee may practice applying intermittent force to the sternum of the mannequin to stimulate the lungs to circulate oxygenated blood flow.

Several types and models of trainer mannequins having human features and physical characteristics are available for such use. Many types and models have complex design and/or are made with special materials to provide a mannequin that looks and feels as humanly lifelike as possible. Additionally, the various models available include size differentials to accommodate child trainees as well as training the techniques to be performed on child-sized persons and infant-sized persons. In all such types, common deficiencies have been found due to the complexity of design and the materials from which the mannequin is made. Therefore, it is highly desirable to provide a new and improved trainer mannequin.

Prior art trainer mannequins are generally deficient in their availability to a large group of trainees. These prior art mannequins are relatively expensive to produce or purchase as a result of complex design and/or manufacturing materials. As a result, a given basic aid training class may only have one or a very few mannequins available for multiple trainees, causing delays in training sessions due to sharing of mannequins among several trainees performing a given technique. The only solution to this problem has been to decrease class size, which then puts a burden upon the providers of such classes due to increased numbers of classes required to train the same number of trainees. Thus, it is highly desirable to provide a new and improved trainer mannequin for which design and materials do not present a cost prohibitive obstacle to providing a mannequin to all trainees in a given basic aid training class, regardless of the size of the class.

Prior art trainer mannequins are specifically deficient regarding their appropriateness for accommodating basic aid training classes for adolescent and minor children. Although prior art mannequins have been designed specifically for use by such children, children, individually and as part of a large trainee group, can be destructive toward the trainer mannequin despite admonitions from adult supervisor trainers and instructors. As a result, even where the cost of obtaining mannequins is defrayed by rental or lease of the mannequin, the provider of the training classes has had to bear the cost of repair and/or replacement of the mannequins harmed by the destructive behavior. Thus, it is highly desirable to provide a new and improved trainer mannequin that accommodates for the destructive behavior of one or a few adolescent or minor children participating in a basic aid training class.

Prior art trainer mannequins are additionally specifically deficient regarding appropriateness for accommodating basic aid training classes for minor children because they generally arrive pre-assembled or in other form not susceptible to visual investigation of the physiology involving basic aid training techniques. As a result, children participating in basic aid training classes are deprived of a meaningful learning experience. Thus, it is highly desirable to provide a new and improved trainer mannequin which affords minor children an opportunity to learn the physiology of basic aid training techniques through visual investigation or through actual assembly and disassembly of the mannequin.

Trainer mannequins such as the one disclosed herein are most desirable if they provide hygienic protection as between trainee users of the mannequin. As a result, a mannequin that is disposable after use by one person is desirable. Therefore, it is highly desirable to provide a new and improved trainer mannequin of simple construction that is convenient to use and can be manufactured relatively inexpensively so as to be disposable.

Finally, it is highly desirable to provide a new and improved trainer mannequin having all of the above identified features.

SUMMARY OF THE INVENTION

It is therefore an object of the invention to provide a new and improved trainer mannequin.

It is also an object of the invention to provide a new and improved trainer mannequin of simple construction and relatively inexpensive manufacture so as to be economically viable to provide to all of the participants in a basic aid training class of any size.

It is also an object of the invention to provide a new and improved trainer mannequin that can be abused and/or destroyed by minor children participating in basic aid training classes without incurring the burden of the cost of repair and/or replacement such that the basic aid training classes become cost prohibitive or such that a fewer number of mannequins are available per child.

It is also an object of the invention to provide a new and improved trainer mannequin that provides learning opportunities to minor children regarding the physiology of basic aid training techniques through the steps of assembly of the mannequin or through visual investigation.

It is also an object of the invention to provide a new and improved trainer mannequin of simple construction that is convenient to use and can be manufactured relatively inexpensively so as to be disposable.

It is finally an object of the invention to provide a new and improved trainer mannequin having all of the above identified features.

In the broader aspects of the invention, there is provided a new and improved trainer mannequin comprising a body having a head and a torso made of common household items. The head and the torso are hollow. The head has openings for a mouth and two nostrils, and additionally has a neck and a neck opening. All the openings provide access to the interior of the head. The torso also has a neck and neck opening, and is secured to the head by connecting the necks in a way that provides a seal between the interior of the head and the torso. The torso additionally can be interchanged to provide training in three basic aid training techniques. For mouth-to-mouth breathing, an attached bag is collapsible and expandable to simulate a lung. For aid in choking, also known as the Heimlich maneuver, the torso is self-supporting in order to provide a more constant volume and greater resistance to collapsing. This torso also simulates a full human torso including stomach and chest. For training this technique, an object is securely placed in the neck of the mannequin to restrict the air flow between the torso and the head, but the object may be forcibly removed from the neck by compressing the torso. Finally, for chest compression training, the torso is the same or similar to the torso for the choking technique, but the bottom is removed in order to stuff it with a filler to provide additional resistance to collapsing and rebounding of the torso, and has affixed to it a rigid piece simulating a sternum, where the trainee applies the compressive force in this technique.

BRIEF DESCRIPTION OF THE DRAWINGS

The above mentioned and other features and objects of the invention and the manner of attaining them will become more apparent and the invention itself will be better understood by reference to the following description of an embodiment of the invention taken in conjunction with the accompanying drawings wherein:

FIG. 3 is a perspective exploded view showing the torso for the new and improved trainer mannequin for use in teaching chest compression techniques; and FIG. 4 is a top view of the fully assembled trainer mannequin from FIG. 3.

DESCRIPTION OF A SPECIFIC EMBODIMENT

Figure 1:
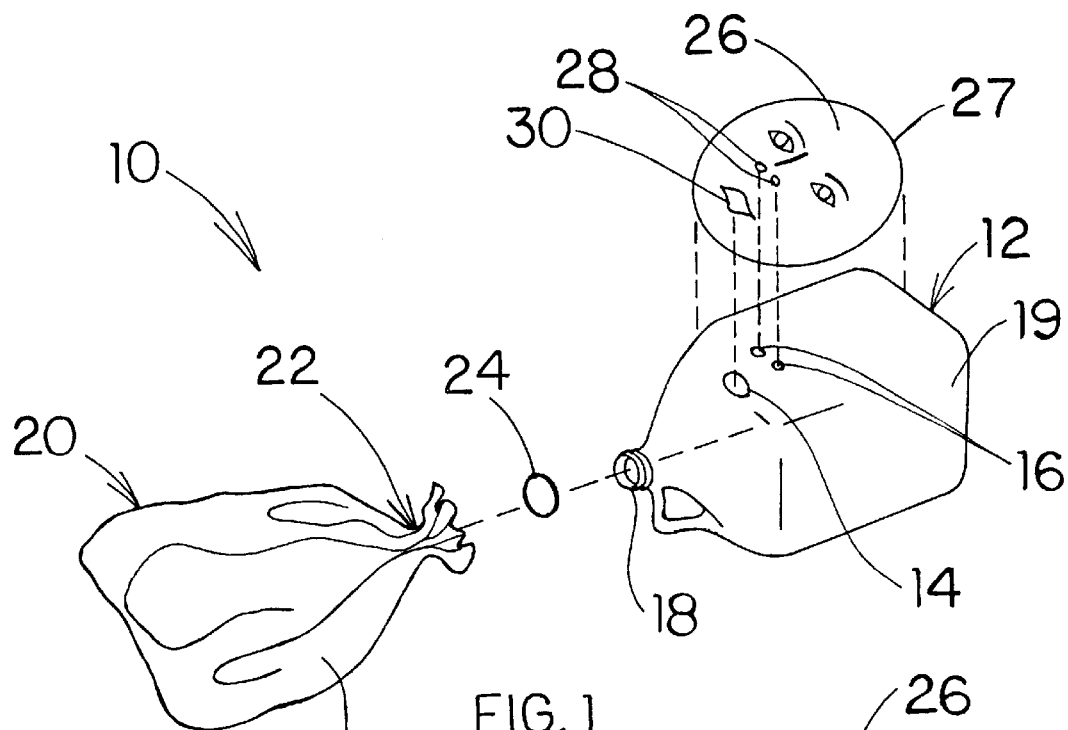
FIG. 1 is a perspective exploded view showing the layout of the elements of the new and improved trainer mannequin having the torso for use in teaching mouth-to-mouth breathing techniques.
Figure 2:
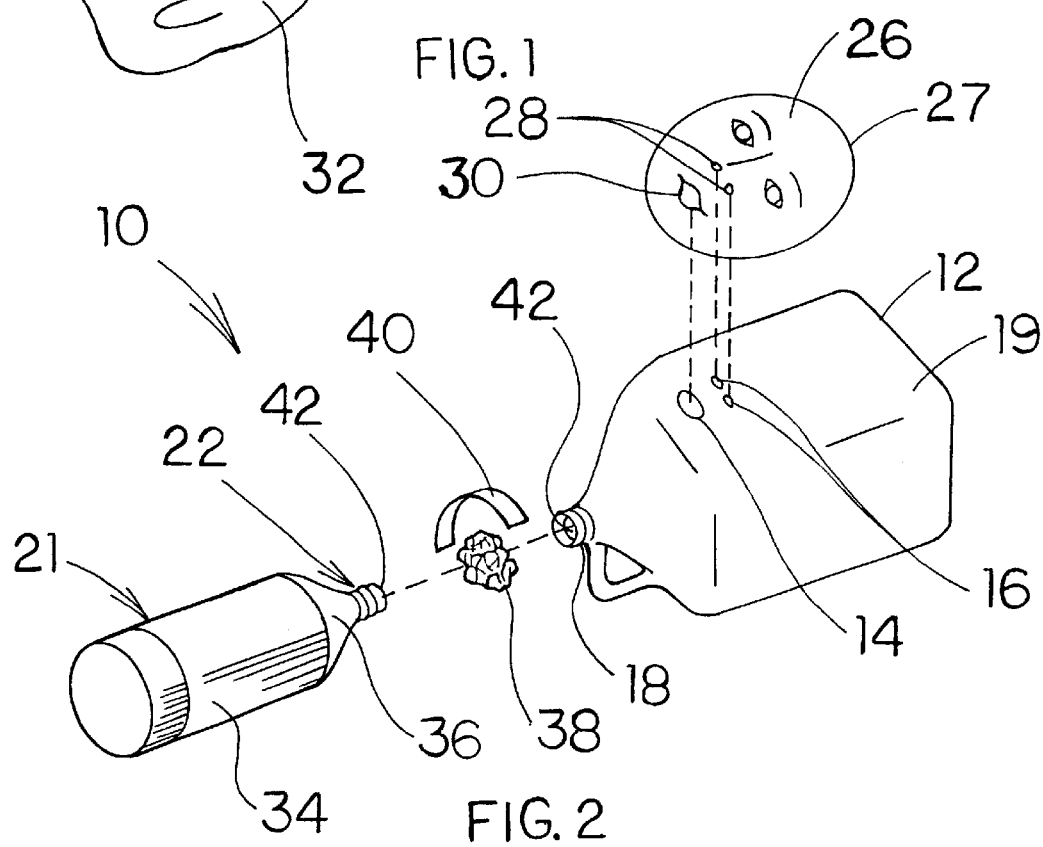
FIG. 2 is a perspective exploded view showing the layout of the elements of the new and improved trainer mannequin having the torso for use in teaching choking aid techniques.

FIGS. 1–4 illustrate the new and improved trainer mannequin of the present invention. FIGS. 1–3 show the interconnection of a humanoid mannequin body 10 having a head 12 and different embodiments of a torso 20, 21, 43. Generally, mannequin 10 comprises a hollow head 12 with openings for a mouth 14, two nostrils 16, and a neck 18. In other specific embodiments, the nostrils may be denoted by markings on the exterior surface of the head instead of by openings. A hollow torso 20 also having a neck 22 is attached to head 12. The torso neck 22 is securely connected to the head neck 18 so that the point of connection is sealed. In a specific embodiment, neck 22 of the torso is sealed to neck 18 of head 12 with a rubber band 24. In other specific embodiments, the two necks are sealed with an adhesive strip 40 such as tape for holding torso 21, 43 onto head 12.

Head 12 of mannequin 10 generally conforms to the shape of a human head. In a specific embodiment, head 12 comprises a hollow plastic head of constant volume. In other specific embodiments, head 12 comprises a thin-walled head of constant volume which is self-supporting and sufficiently rigid such that it cannot be collapsed or inflated by the human breath. In yet another specific embodiment, head 12 comprises an empty conventional one-gallon milk jug 19 made of polyethylene or other plastic material, such as is commonly used for packaging and selling milk and as is normally found in grocery stores or other locations where milk is commonly sold to consumers in one gallon containers.

Referring now to FIG. 1, torso 20 of mannequin 10 generally conforms to the shape of a human lung for use with training mouth-to-mouth breathing techniques. In a specific embodiment, torso 20 can be a flexible plastic lung. In other specific embodiments, torso 20 can be a thin-walled flexible lung with a fixed range of volume such that the lung may be collapsed or inflated by the human breath. In other specific embodiments, torso 20 can be a plastic bag 32 having a full capacity volume of at least one quart, but no larger than a volume that demonstrably shows the inflation and deflation of the plastic bag when a trainee operates the mannequin of FIG. 1.

Referring now to FIG. 2, torso 21 of mannequin 10 generally conforms to the shape of a human chest for use with training choking aid techniques. In a specific embodiment, torso 21 can be a hollow plastic torso of constant volume. In other specific embodiments, torso 21 can be a thin-walled torso of constant volume which is self supporting and sufficiently rigid such that it cannot be collapsed or inflated by human breath, but which is reversibly collapsible such that it may be collapsed by an exterior applied force, and easily returned to its original configuration naturally or by manual manipulation. In other specific embodiments, torso 21 can be an empty conventional two-liter bottle 34 having cylindrical shape and a neck tapering into a neck pouring spout 36, such as is commonly used for packaging carbonated soft drinks, such as cola and other soda beverages.

Trainer mannequin 10 of FIG. 2 is shown with a valve 38 that is placed within the mannequin at neck 22 of the torso 21 for use with training choking aid techniques. Valve 38 serves to restrict the flow of air between torso 21 and head 12. In a specific embodiment, valve 38 can be a wad of compressible material with a medium degree of elasticity. In other specific embodiments, valve 38 can be a wad of material that is compressed to fit within mannequin 10 at the point of connection but which is sufficiently elastic to expand to fill passageway 42 between torso 21 and the head 12 in order to restrict the flow of air between them. In other specific embodiments, valve 38 can be a wad of cotton or tissue large enough to fill passageway 42.

Torso 43 of FIG. 3 is similar to torso 21 of FIG. 2, but is shown with a wide opening 44 at the end opposite its neck, and is for use with training chest compression techniques. A filler 46 is placed inside the torso 43 through this wide opening 44 for use with providing support to the walls of the torso 43 from within. In a specific embodiment, filler 46 can be a mass of compressible material with a medium degree of elasticity. In other specific embodiments, filler 46 can be a mass of material compressed to fit within torso 43, but which is sufficiently elastic to expand to fill torso 43 and provide additional support and rigidity to the walls of torso 43, in order to resist compression due to exterior applied forces. In other specific embodiments, filler 46 can be a mass of crumpled paper or strips of paper, such as writing paper or newspaper, or a mass of cotton, facial tissue, cloth, or any other such material in a large enough quantity to fill the entire torso 43.

Torso 43 of FIG. 3 additionally shows a rigid compression piece 48 affixed to the exterior 50 of torso 43 for use with simulating a human sternum and providing the trainee a reference for practicing chest compressions. Compression piece 48 may be affixed with a suitable adhesive. The piece shown is generally rectangular and is positioned lengthwise along the longitudinal alignment 54 of mouth opening 14 and nostril openings 16 or markings of head 12. In a specific embodiment, piece 48 can be a thin, rectangular plastic or wooden piece. In other specific embodiments, piece 48 can be a common, elongated medical tongue depressor.

In a specific embodiment, a face 26 may be secured to the exterior of head 12 for providing the mannequin with human facial features. In a specific embodiment, face 26 may be a free-hand drawing of typical human facial features marked directly onto the exterior surface of head 12 in proximity to mouth opening 14 and nostril openings 16 or markings. In other specific embodiments, face 26 may be a paper cutout piece 27 having a drawing of a face. In other specific embodiments, the face can be a paper cutout piece 27 having mouth 30 and nostrils 28 cut out and coaxially positioned over the top of mouth opening 14 and nostril openings 16 or markings on head 12. A paper cutout face piece 27 may be secured to the exterior of head 12 by a suitable adhesive such as white household glue or an adhesive strip such as clear cellophane or masking tape.

In a specific embodiment, a rib cage 52 may be secured to the exterior of torso 21, 43 for providing mannequin 10 with visual anatomical references. In a specific embodiment, the rib cage 52 may be a free-hand drawing marked directly on the exterior surface 50 of the torso, depicting the front portion of a human rib cage having a sternum and a plurality of rib bones extending therefrom and wrapping around the exterior surface of the torso. In other specific embodiments, the rib cage 52 can be a paper cutout piece 53 having a drawing of the front portion of a human rib cage. Any rib cage piece 53 secured to the exterior surface of the torso is positioned lengthwise along the longitudinal alignment 54 of mouth opening 14 and nostril openings 16 or markings of head 12 and is placed over top of the rigid compression piece 48. A paper cutout rib cage piece 53 may be secured to the exterior 50 of the torso 43 by a suitable adhesive such as white household glue or an adhesive strip such as clear cellophane or masking tape.

In operation, the trainer mannequin 10 teaches basic aid training techniques. In the embodiment of FIG. 1, as mannequin 10 lays prone on a surface with mouth opening 14 and nostril openings 16 facing upwards, a trainee learns mouth-to-mouth breathing by covering nostril openings 16, or symbolically covering the nostril markings, and blowing into mouth opening 14. Such blowing inflates torso 32 depicted in FIG. 1 due to the sealed connection of the torso and head necks 22, 18 and due to the covered nostril openings 16. When the trainee stops blowing, torso 32 deflates through mouth opening 14. In the embodiment of FIG. 2, a trainee learns a choking aid technique by compressing and placing valve 38 into neck 22 of torso 21 just prior to connecting the torso and head necks 22, 18. Valve 38 acts a choking agent by restricting the flow of air due to its elastic expansion in the connection point. Once head 12 and torso 21 are sealed together, the trainee holds mannequin 10 such that it is upright and facing away from the trainee. The trainee dislodges the choking agent valve 38 by wrapping his or her hands or arms around the front of torso 21 and compressing the torso against the trainee's body. Such compression forces air out of torso 21 with force sufficient to remove the choking agent valve 38 from neck 22 of torso 21 and into the interior of head 12. Air forced from the torso by such compression escapes head 12 though mouth opening 14 and nostril openings 16. In the embodiment of FIGS. 3 and 4, a trainee learns chest compressions to aid in cardiopulmonary resuscitation techniques by applying intermittent compressive forces to torso 43 as mannequin 10 lays prone on a surface, with the rigid piece 48 facing upward. Rigid piece 48 aids the training by serving as a sternum, and as such providing a realistic anatomical reference for trainee's application of compressive forces. Filler 46 aids this training by providing a malleable solidness that imitates a human chest in a way that provides anatomical reality to the trainee in gaining the feeling of providing chest compression to a real person.

The new and improved trainer mannequin 10 of the invention provides a mannequin of simple construction and relatively inexpensive manufacture so to be economically viable for insuring each trainee in a basic aid training class of any size has a mannequin on which to practice. Another result of the new and improved trainer mannequin is that repair or replacement of abused and destroyed mannequins does not impose a financial burden on providers of basic aid training classes or affect availability of additional mannequins. The new and improved trainer mannequin provides a learning opportunity for children regarding the physiology of basic aid training techniques through assembly and visual investigation of the mannequin. The new and improved trainer mannequin provides all of these features and yet is simple in construction, convenient to use, and can be manufactured relatively inexpensively such that it is disposable.

While a specific embodiment of the invention has been shown and described herein for purposes of illustration, the protection offered by any patent which may issue upon this application is not strictly limited to the disclosed embodiment; but rather extends to all structures and arrangements which fall fairly within the scope of the claims which are appended hereto.

What is claimed is:

1. A basic aid training mannequin comprising a hollow head and a hollow torso connected to said hollow head, said hollow head having a mouth opening and a head neck opening, said mouth opening and said head neck opening each communicating with the interior of said hollow head, said torso having a torso neck opening and being collapsible and expandable, said torso neck opening being removably and sealably connected to said head neck opening to define a passageway between the interior of said hollow torso and the interior of said hollow head; said hollow head comprising an empty plastic conventional milk jug and said hollow torso comprising a flexible plastic bag.

2. The basic aid training mannequin of claim 1 wherein said hollow head comprises an empty conventional one-gallon milk jug having a top opening and a handle on one side, said top opening being said head neck opening, said mouth opening being cut out of said jug.

3. The basic aid training mannequin of claim 2 wherein said mouth opening is cut out of said jug on an opposite side of said jug from said handle.

4. The basic aid training mannequin of claim 2 wherein a paper cut out face having a mouth hole is affixed to said jug, said mouth opening being aligned with said mouth hole to communicate with the interior of said jug.

5. The basic aid training mannequin of claim 2 further comprising two nostril markings on said jug proximate to said mouth opening.

6. The basic aid training mannequin of claim 5 wherein a paper cut out face having two nostril holes is affixed to said jug, said two nostril holes being aligned with said two nostril markings.

7. The basic aid training mannequin of claim 6 wherein said two nostril markings comprise two nostril openings cut out of said jug, each communicating with the interior of said jug.

8. The basic aid training mannequin of claim 1 wherein said hollow torso comprises a plastic bag having an opening and a volume capacity of at least one quart, said opening being said torso neck opening, said opening being removably and sealably connected to said head neck opening.

9. The basic aid training mannequin of claim 8 wherein said opening is removably and sealably connected to said head neck opening with a rubber band.

10. A basic aid training mannequin comprising a hollow head and a hollow torso connected to said hollow head, said hollow head comprising an empty conventional one-gallon milk jug having a top opening and a handle on one side, said jug having a mouth opening cut out of said jug, said top opening being a head neck opening, said head neck opening and said mouth opening each communicating with the interior of said jug, said hollow torso comprising a plastic bag having an opening and a volume capacity of at least one quart, said bag opening being removably and sealably connected to said top opening to define a passageway between the interior of said jug and the interior of said bag, said jug also having two nostril openings proximate to said mouth opening, and a paper cut out face having a mouth hole and two nostril holes, said paper cut out face being affixed to said jug and positioned so that said mouth opening is aligned with said mouth hole and said two nostril openings are aligned with said two nostril holes.

11. The basic aid training mannequin of claim 10 wherein said mouth opening is cut out of said jug on an opposite side of said jug from said handle.

12. The basic aid training mannequin of claim 10 wherein said bag opening is removably and sealably connected to said top opening with a rubber band.

13. A basic aid training mannequin comprising a hollow head and a hollow torso connected to said hollow head, said hollow head having a mouth opening and a head neck opening, said mouth opening and said head neck opening each communicating with the interior of said hollow head, said torso having a torso neck opening and having a semi-rigid exterior wall that is reversibly collapsible, said torso neck opening being removably and sealably connected to said head neck opening to define a passageway between the interior of said hollow torso and the interior of said hollow head, and a valve removably secured within said passageway to restrict the communication therethrough between the interior of said hollow torso and the interior of said hollow head; said hollow head covential milk jug comprising an empty conventional milk jug and said hollow torso comprising an empty covential plastic bottle milk jug, said valve comprising a common household object selected from the group of household objects consisting of wads of paper, cotton, and tissue.

14. The basic aid training mannequin of claim 13 wherein said hollow head comprises an empty conventional one-gallon milk jug having a top opening and a handle on one side, said top opening being said head neck opening, said mouth opening being cut out of said jug.

15. The basic aid training mannequin of claim 14 wherein said mouth opening is cut out of said jug on an opposite side of said jug from said handle.

16. The basic aid training mannequin of claim 14 wherein a paper cut out face having a mouth hole is affixed to said jug, said mouth opening being aligned with said mouth hole to communicate with the interior of said jug.

17. The basic aid training mannequin of claim 14 further comprising two nostril markings on said jug proximate to said mouth opening.

18. The basic aid training mannequin of claim 17 wherein a paper cut out face having two nostril holes is affixed to said jug, said two nostril holes being aligned with said two nostril markings.

19. The basic aid training mannequin of claim 18 wherein said two nostril markings comprise two nostril openings cut out of said jug, each communicating with the interior of said jug.

20. The basic aid training mannequin of claim 13 wherein said hollow torso comprises an empty conventional two-liter plastic bottle having a top opening, said bottle top opening being said torso neck opening, said bottle top opening being removably and sealably connected to said head neck opening, and wherein said valve comprises a wad of material selected from the group consisting of cotton and tissue.

21. The basic aid training mannequin of claim 20 wherein said bottle top opening is removably and sealably connected to said head neck opening with a strip of adhesive tape.

22. A basic aid training mannequin comprising a hollow head and a hollow torso connected to said hollow head, said hollow head comprising an empty conventional one-gallon milk jug having a top opening and a handle on one side, said top opening comprising a head neck opening, a mouth opening being cut out of said jug, two nostril openings being cut out of said jug proximate to said mouth opening, said mouth opening, said head neck opening, and said two nostril openings each communicating with the interior of said hollow head, said hollow torso comprising an empty conventional two-liter plastic bottle having a top opening, said bottle top opening being removably and sealably connected to said head neck opening to define a passageway between the interior of said hollow torso and the interior of said hollow head, a valve removably secured within said passageway, said valve comprising a wad of material selected from the group consisting of cotton and tissue, and a paper cut out face having a mouth hole and two nostril holes, said paper cut out face being affixed to said jug and positioned so that said mouth opening is aligned with said mouth hole and said two nostril openings are aligned with said two nostril holes.

23. The basic aid training mannequin of claim 22 wherein said mouth opening is cut out of said jug on an opposite side from said handle.

24. The basic aid training mannequin of claim 22 wherein said bottle top opening is removably and sealably connected to said head neck opening with a strip of adhesive tape.

25. A basic aid training mannequin comprising a hollow head and a hollow torso connected to said hollow head, said hollow head having a mouth opening and a head neck opening, said mouth opening and said head neck opening each communicating with the interior of said hollow head, said torso having a torso neck opening and being resiliently collapsible, said torso neck opening being removably and sealably connected to said head neck opening to define a passageway between the interior of said hollow torso and the interior of said hollow head, an elongated rigid compression piece affixed to the exterior of said hollow torso longitudinally and in alignment with said mouth opening, and a soft compression filler removably placed throughout the interior of said hollow torso; said hollow head comprising an empty plastic conventional milk jug and said hollow torso comprising an empty conventional plastic bottle; said rigid compression piece comprising a medical tongue depressor; and said soft compression filler comprising a common household object selected from the group of household objects consisting of paper, cotton, tissue, and cloth.

26. The basic aid training mannequin of claim 25 wherein said hollow head comprises an empty conventional one-gallon milk jug having a top opening and a handle on one side, said top opening being said head neck opening, said mouth opening being cut out of said jug on an opposite side of said jug from said handle.

27. The basic aid training mannequin of claim 26 wherein said mouth opening is cut out of said jug on an opposite side of said jug from said handle.

28. The basic aid training mannequin of claim 26 wherein a paper cut out face having a mouth hole is affixed to said jug, said mouth opening being aligned with said mouth hole to communicate with the interior of said jug.

29. The basic aid training mannequin of claim 26 further comprising two nostril markings on said jug proximate to said mouth opening.

30. The basic aid training mannequin of claim 29 wherein a paper cut out face having two nostril holes is affixed to said jug, said two nostril holes being aligned with said two nostril markings.

31. The basic aid training mannequin of claim 30 wherein said two nostril markings comprise two nostril openings cut out of said jug, each communicating with the interior of said jug.

32. The basic aid training mannequin of claim 25 wherein said hollow torso comprises an empty conventional two-liter plastic bottle having a top opening, said bottle top opening being said torso neck opening, said bottle having a bottom opening defined by the removal of a bottom portion from said bottle, said soft compression filler being removably placed throughout the interior of said hollow torso through said bottom opening, said soft compression filler comprising material selected from the group consisting of a plurality of pieces of paper, cotton, facial tissue, and cloth, said elongated rigid compression piece comprising a common medical tongue depressor manufactured of a material selected from the group consisting of wood and plastic.

33. The basic aid training mannequin of claim 32 wherein a paper cut out having a depiction of a rib cage including a sternum is affixed to the exterior of said hollow torso, said paper cut out being positioned so that said depiction of a sternum on said paper cut out overlies said medical tongue depressor.

34. The basic aid training mannequin of claim 32 wherein said bottle top opening is removably and sealably connected to said head neck opening with a strip of adhesive tape.

35. A basic aid training mannequin comprising a hollow head and a hollow torso connected to said hollow head, said hollow head comprising an empty conventional one gallon milk jug having a top opening and a handle on one side, said top opening comprising a head neck opening, a mouth opening being cut out of said jug, two nostril openings being cut out of said jug proximate to said mouth opening, said head neck opening, said mouth opening and said two nostril openings each communicating with the interior of said jug, said hollow torso comprising an empty conventional two-liter plastic bottle having a top opening, said bottle top opening being removably and sealably connected to said head neck opening to define a passageway between the interior of said hollow torso and the interior of said hollow head, said bottle also having a bottom opening defined by the removal of a bottom portion from said bottle, an elongated rigid compression piece comprising a common medical tongue depressor affixed to the exterior of said bottle longitudinally and in alignment with said mouth opening, said common medical tongue depressor manufactured of a material selected from the group of materials consisting of wood and plastic, a soft compression filler being removably placed throughout the interior of said bottle through said bottom opening, a paper cut out face having a mouth hole and two nostril holes, said paper cut out face being affixed to said jug and positioned so that said mouth opening is aligned with said mouth hole and said two nostril openings is aligned with said two nostril holes, and a paper cut out having a depiction of a rib cage including a sternum is affixed to the exterior of said bottle and positioned so that said depiction of a sternum on said paper cut out overlies said common medical tongue depressor.

36. The basic aid training mannequin of claim 35 wherein said mouth opening is cut out of said jug on an opposite side of said jug from said handle.

37. The basic aid training mannequin of claim 35 wherein said bottle top opening is removably and sealably connected to said head neck opening with a strip of adhesive tape.

* * * * *